United States Patent
Mitsui et al.

(10) Patent No.: US 10,142,849 B2
(45) Date of Patent: Nov. 27, 2018

(54) COMMUNICATION CONTROL METHOD AND RADIO BASE STATION USING HANDOVER COUNT INFORMATION

(71) Applicant: KYOCERA CORPORATION, Kyoto (JP)

(72) Inventors: Katsuhiro Mitsui, Kawasaki (JP); Masato Fujishiro, Yokohama (JP); Kugo Morita, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 61 days.

(21) Appl. No.: 15/124,457

(22) PCT Filed: Mar. 20, 2015

(86) PCT No.: PCT/JP2015/058581
§ 371 (c)(1),
(2) Date: Sep. 8, 2016

(87) PCT Pub. No.: WO2015/141843
PCT Pub. Date: Sep. 24, 2015

(65) Prior Publication Data
US 2017/0019793 A1 Jan. 19, 2017

(30) Foreign Application Priority Data
Mar. 20, 2014 (JP) ................. 2014-059274

(51) Int. Cl.
| | |
|---|---|
| H04W 16/08 | (2009.01) |
| H04W 24/02 | (2009.01) |
| H04W 92/12 | (2009.01) |
| H04W 92/20 | (2009.01) |
| H04W 52/02 | (2009.01) |

(52) U.S. Cl.
CPC ........... *H04W 16/08* (2013.01); *H04W 24/02* (2013.01); *H04W 52/0206* (2013.01); *H04W 92/12* (2013.01); *H04W 92/20* (2013.01); *Y02D 70/00* (2018.01); *Y02D 70/1242* (2018.01); *Y02D 70/1262* (2018.01)

(58) Field of Classification Search
CPC . H04W 16/08; H04W 52/0206; H04W 92/20; H04W 92/12; H04W 24/02
See application file for complete search history.

(56) References Cited

U.S. PATENT DOCUMENTS

| | | | |
|---|---|---|---|
| 2012/0063317 A1 | 3/2012 | Muraoka et al. | |
| 2014/0051446 A1 | 2/2014 | Rose et al. | |

FOREIGN PATENT DOCUMENTS

| | | |
|---|---|---|
| JP | 2014-154997 A | 8/2014 |
| WO | 2010/110189 A1 | 9/2010 |

OTHER PUBLICATIONS

International Search Report issued in PCT/JP2015/058581; dated Jun. 16, 2015.

(Continued)

*Primary Examiner* — Jackie Zuniga Abad
(74) *Attorney, Agent, or Firm* — Studebaker & Brackett PC

(57) ABSTRACT

A first radio base station counts a first handover number that is the number of handovers to a cell managed by the first radio base station and a second handover number that is the number of handovers from the cell in a predetermined period of time; and notifies a second radio base station or an operation, administration, and maintenance (OAM) apparatus of the first handover number and the second handover number.

14 Claims, 12 Drawing Sheets

(56) References Cited

OTHER PUBLICATIONS

Written Opinion issued in PCT/JP2015/058581; dated Jun. 16, 2014.
Alcatel-Lucent; Criteria for the switch-off decision; 3GPP TSG RAN WG3 Meeting #83; R3-140297; Feb. 10-14, 2014; pp. 1-2; Prague, Czech Republic.

FIG. 6

| IE/GROUP NAME | PRESENCE | RANGE | IE TYPE AND REFERENCE | SEMANTICS DESCRIPTION |
|---|---|---|---|---|
| NEIGHBOR CELL SITUATION | | | | |
| >HO HISTORY | M | | | |
| >>INCOMING HO | M | | NTEGER (0..32767) | NUMBER OF HO REQUESTS |
| >>>CELL ID | M | ECGI/PCI | | |
| >>OUTGOING HO | O | | NTEGER (0..32767) | NUMBER OF HO REQUESTS |
| >TIME PERIOD | M | | ENUMERATED (0,1,2...23) DURATION MAY BE DELIMITED ACCORDING TO OPERATOR CIRCUMSTANCES | 0>0:00-1:00 1>1:00-2:00 2>2:00-3:00 . . . 23>23:00-0:00 |

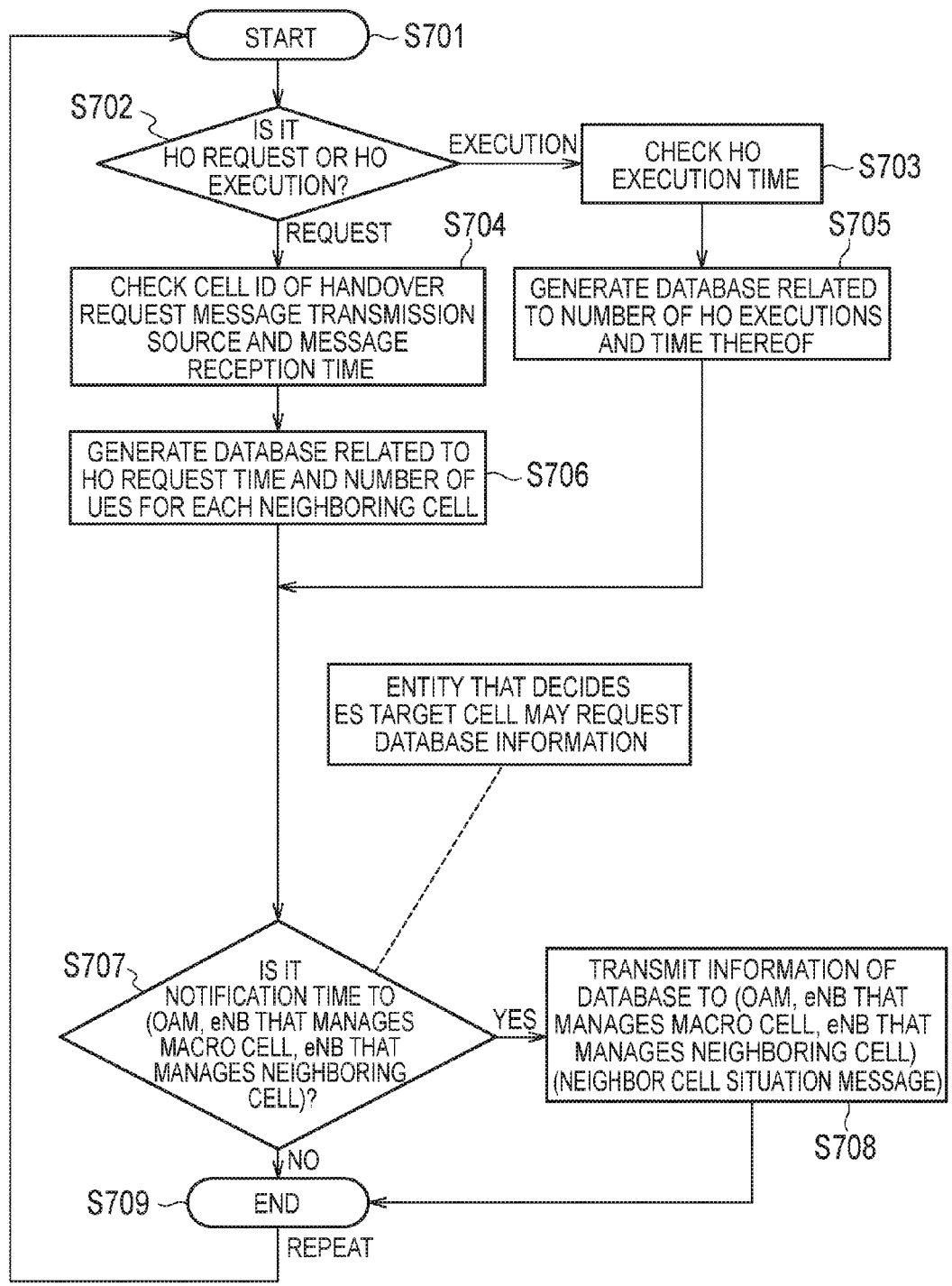

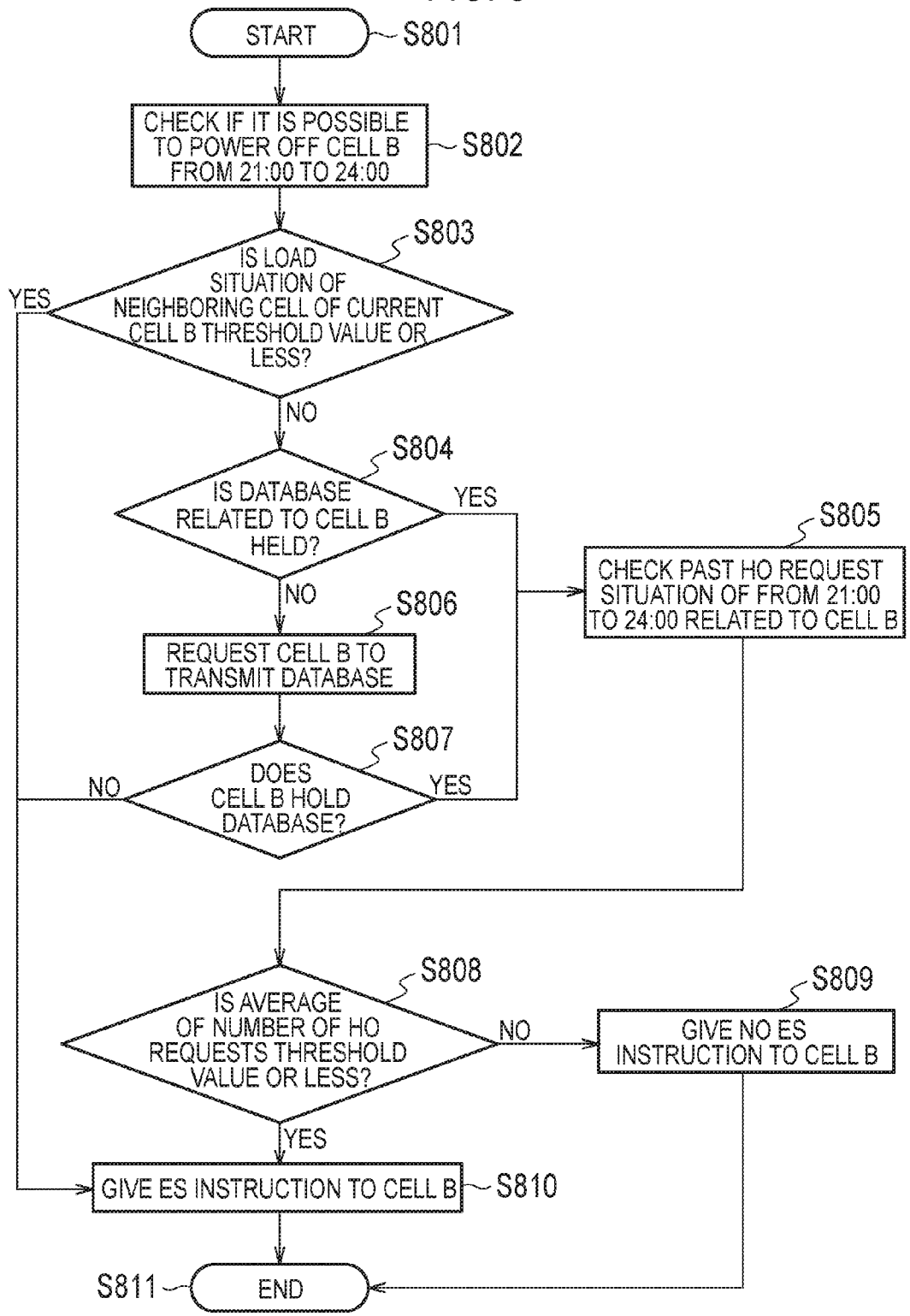

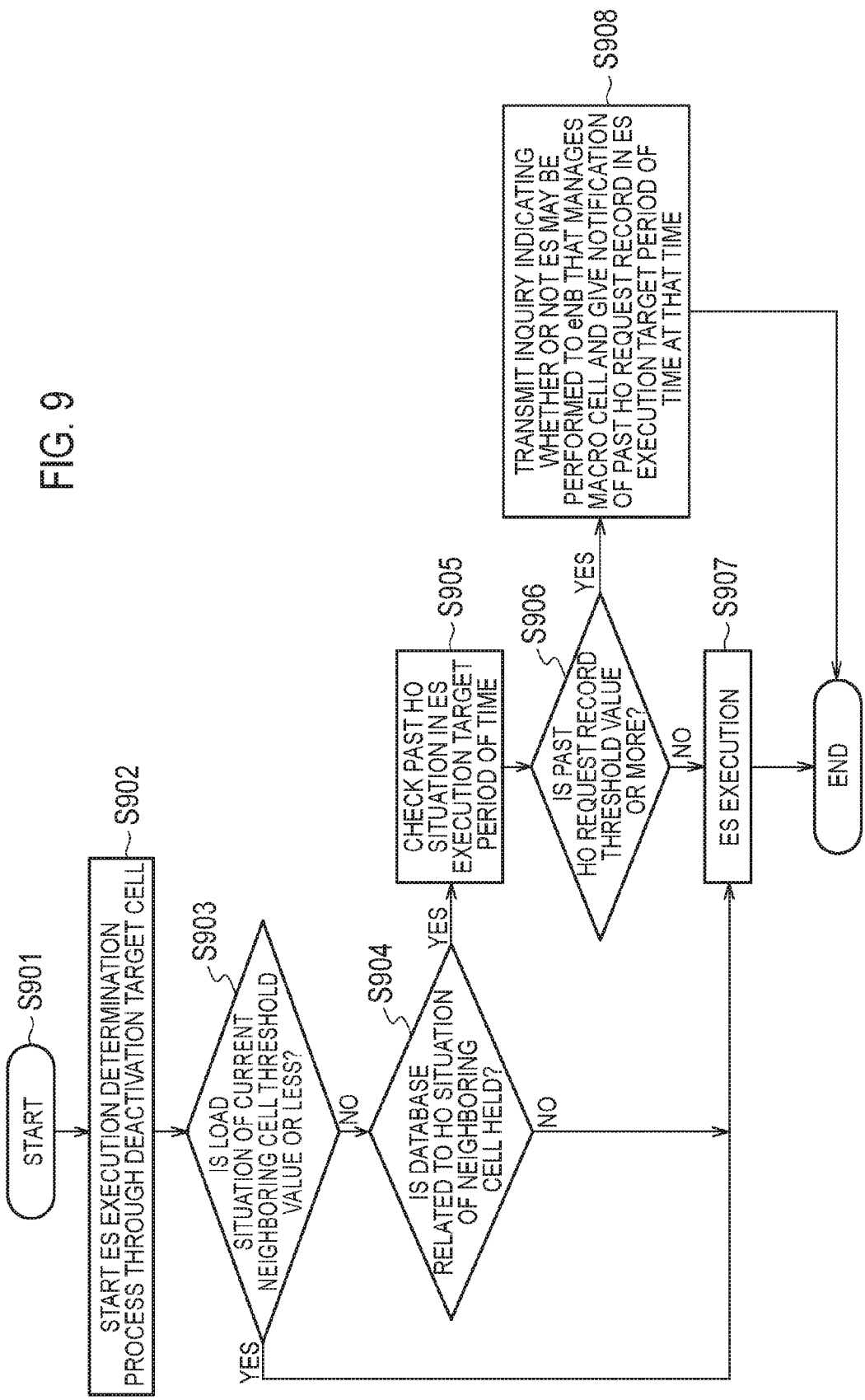

FIG. 10

| IE/GROUP NAME | PRESENCE | RANGE | IE TYPE AND REFERENCE | |
|---|---|---|---|---|
| CELL DEACTIVATION | | | | |
| >CELL ID | M | | ECGI | ID OF DEACTIVATION TARGET CELL |
| >CELL RESOURCE SITUATION | | | | LOAD SITUATION OF DEACTIVATION TARGET CELL |
| >>HARDWARE LOAD INDICATOR | O | | | |
| >>RADIO RESOURCE STATUS | O | | | |
| >>COMPOSITE AVAILABLE CAPACITY GROUP | O | | | |
| >NUMBER OF INCOMING HO | M | | INTEGER (0..32767) | TOTAL NUMBER OF HO REQUESTS FROM NEIGHBORING CELL TO DEACTIVATION TARGET CELL IN PREDETERMINED TIME ZONE IN PAST |
| >>TIME PERIOD | M | | ENUMERATED (0,1,2,...23) DURATION MAY BE DELIMITED ACCORDING TO OPERATOR CIRCUMSTANCES | 0>0:00-1:00 1>1:00-2:00 2>2:00-3:00 . . . 23>23:00-0:00 |
| >NUMBER OF OUTGOING HO | O | | INTEGER (0..32767) | TOTAL NUMBER OF HO EXECUTIONS FROM DEACTIVATION TARGET CELL TO ANOTHER CELL IN PREDETERMINED TIME ZONE IN PAST |
| >>TIME PERIOD | M | | ENUMERATED (0,1,2,...23) DURATION MAY BE DELIMITED ACCORDING TO OPERATOR CIRCUMSTANCES | 0>0:00-1:00 1>1:00-2:00 2>2:00-3:00 . . . 23>23:00-0:00 |

FIG. 11

| IE/GROUP NAME | PRESENCE | RANGE | IE TYPE AND REFERENCE |
|---|---|---|---|
| MESSAGE TYPE | M | | |
| DEACTIVATED CELL LIST | | 1 .. <maxCellineNB> | |
| >ECGI | M | | |

FIG. 12

| IE/GROUP NAME | PRESENCE | RANGE | IE TYPE AND REFERENCE |
|---|---|---|---|
| CAUSE | M | | OFF REASON THAT DEACTIVATION IS NOT PERMITTED IS INDICATED |

COMMUNICATION CONTROL METHOD AND RADIO BASE STATION USING HANDOVER COUNT INFORMATION

TECHNICAL FIELD

The present invention relates to a communication control method and a radio base station used in a mobile communication system.

BACKGROUND ART

In 3rd Generation Partnership Project (3GPP) that is a mobile communication system standardization project, a power saving (energy saving) technique of reducing power consumption of a network has been introduced. For example, cells managed by a radio base station are powered off (deactivated), for example, during the night in which communication traffic is small.

In 3GPP, an advanced energy saving technique is scheduled to be introduced in Release 12 (for example, see Non-Patent Literature 1). For example, when a certain cell (hereinafter, referred to as a "deactivation target cell") is powered off, transmission power of another neighboring cell (hereinafter, referred to as "supplementary cell") is increased. As a result, the coverage of the supplementary cell expands (coverage expansion) to supplement the coverage of the deactivation target cell (that is, area supplementation).

CITATION LIST

Non Patent Literature

Non patent Literature 1: 3GPP Technical proposal "R3-140297," January, 2014

SUMMARY OF INVENTION

A communication control method according to an embodiment includes the steps of: counting, by a first radio base station, a first handover number that is the number of handovers to a cell managed by the first radio base station and a second handover number that is the number of handovers from the cell in a predetermined period of time; and notifying, by the first radio base station, a second radio base station or an operation, administration, and maintenance (OAM) apparatus of the first handover number and the second handover number.

A communication control method according to an embodiment includes the steps of: counting, by a first radio base station, a first handover number that is the number of handovers to a cell managed by the first radio base station and a second handover number that is the number of handovers from the cell in a predetermined period of time; deciding, by the first radio base station, whether or not the cell is powered off based on the first handover number, the second handover number, a load situation of the cell, and a load situation of a neighboring cell of the cell; and giving, by the first radio base station, a notification indicating that the cell is to be powered off to a second radio base station or an operation, administration, and maintenance (OAM) apparatus when the cell is powered off.

BRIEF DESCRIPTION OF DRAWINGS

FIG. 6 is a diagram illustrating a signal format according to the first embodiment.

FIG. 7 is a flowchart indicating the number of handovers (counting of the number of handovers) according to the first embodiment.

FIG. 8 is a flowchart indicating the number of handovers (power-off decision of OAM) according to the first embodiment.

FIG. 9 is a flowchart indicating the number of handovers (power-off decision of an eNB that manages a deactivation target cell) according to the first embodiment.

FIG. 10 is a diagram illustrating a signal format according to the first embodiment.

FIG. 11 is a diagram illustrating a signal format according to the first embodiment.

FIG. 12 is a diagram illustrating a signal format according to the first embodiment.

DESCRIPTION OF EMBODIMENTS

First Embodiment

Hereinafter, exemplary embodiments in which the present invention is applied to an LTE system will be described.

(System Configuration)

Figure 1:
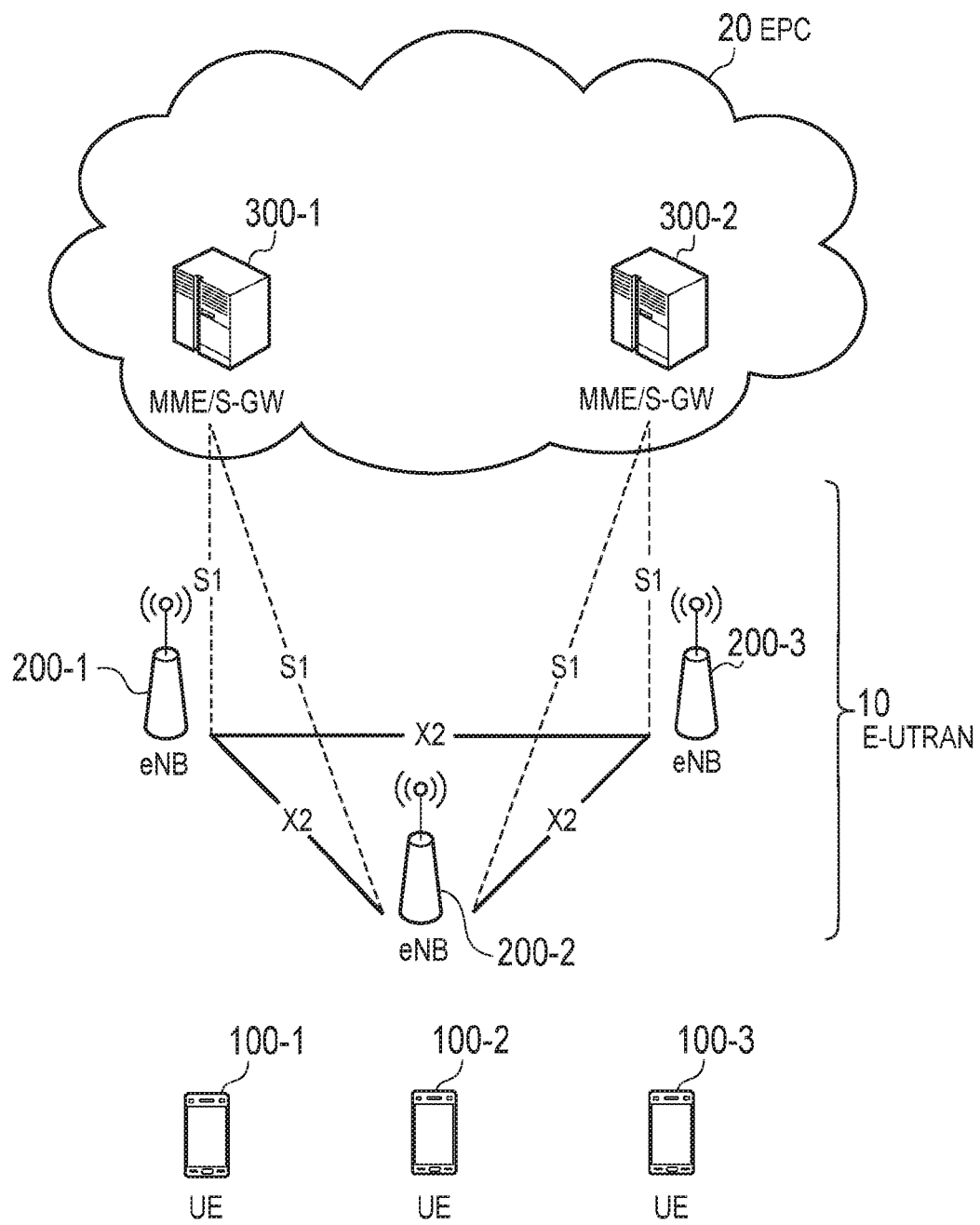
FIG. 1 is a configuration diagram illustrating an LTE system according to first and second embodiments.

FIG. 1 is a configuration diagram illustrating an LTE system according to a first embodiment.

The LTE system according to the first embodiment includes a user equipment (UE) 100, an evolved-UMTS terrestrial radio access network (E-UTRAN) 10, and an evolved packet core (EPC) 20 as illustrated in FIG. 1.

The UE 100 corresponds to a mobile station. The UE 100 is a mobile communication apparatus, and performs radio communication with a cell (a serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to one another via an X2 interface. A configuration of the eNB 200 will be described later.

The eNB 200 manages one or more cells, and performs radio communication with the UE 100 that has established a connection with its own cell. The eNB 200 has a radio resource management (RRM) function, a user data routing function, a measurement control function for mobility control and scheduling, and the like. A "cell" is used not only as a term indicating a minimum unit of a radio communication area but also a term indicating a function of performing radio communication with the UE 100.

The EPC 20 corresponds to a core network. The EPC 20 includes a mobility management entity (MME)/serving-gateway (S-GW) 300. The MME performs various kinds of mobility controls on the UE 100. The S-GW performs user data transfer control. The MME/S-GW 300 is connected with the eNB 200 via an S1 interface.

Figure 2:
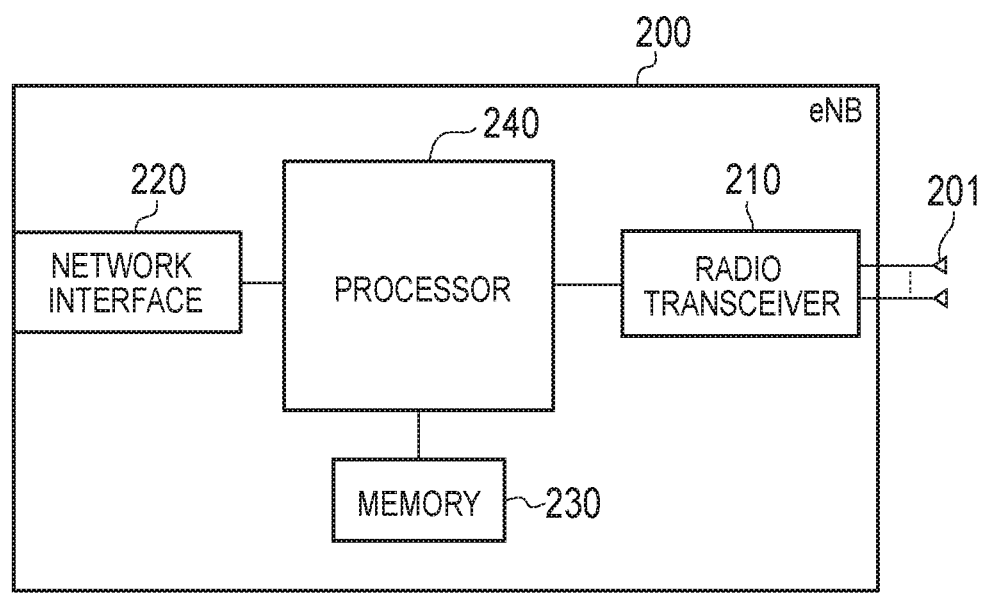
FIG. 2 is a block diagram illustrating an eNB according to the first and second embodiments.

FIG. 2 is a block diagram illustrating the eNB 200. The eNB 200 includes a plurality of antennas 201, a radio transceiver 210, a network interface 220, a memory 230, and a processor 240 as illustrated in FIG. 2. The memory 230 and the processor 240 constitute a controller. The memory 230 may be integrated with the processor 240, and this set (that is, a chip set) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal through the antenna 201. The radio transceiver 210 converts a radio signal received by the antenna 201 into a baseband signal (a reception signal), and outputs the baseband signal to the processor 240.

The network interface 220 is connected with a neighboring eNB 200 via the X2 interface and connected with the MME/S-GW 300 via the S1 interface. The network interface 220 is used for communication performed on the X2 interface and communication performed on the S1 interface.

The memory 230 stores a program executed by the processor 240 and information used for a process performed by the processor 240. The processor 240 includes a baseband processor that perform, for example, modulation, demodulation, encoding, and decoding of the baseband signal and a CPU that performs various kinds of processes by executing the program stored in the memory 230. The processor 240 executes various kinds of processes which will be described later and various kinds of communication protocols.

(Overview of ES)

An advanced energy saving (ES) technique (energy saving enhancement) is introduced into the LTE system according to the first embodiment.

In the advanced ES technique, a combination of a deactivation target cell that is deactivated for power saving and a supplementary cell that supplements the coverage of the deactivation target cell when the deactivation target cell is deactivated is set.

Figure 3:
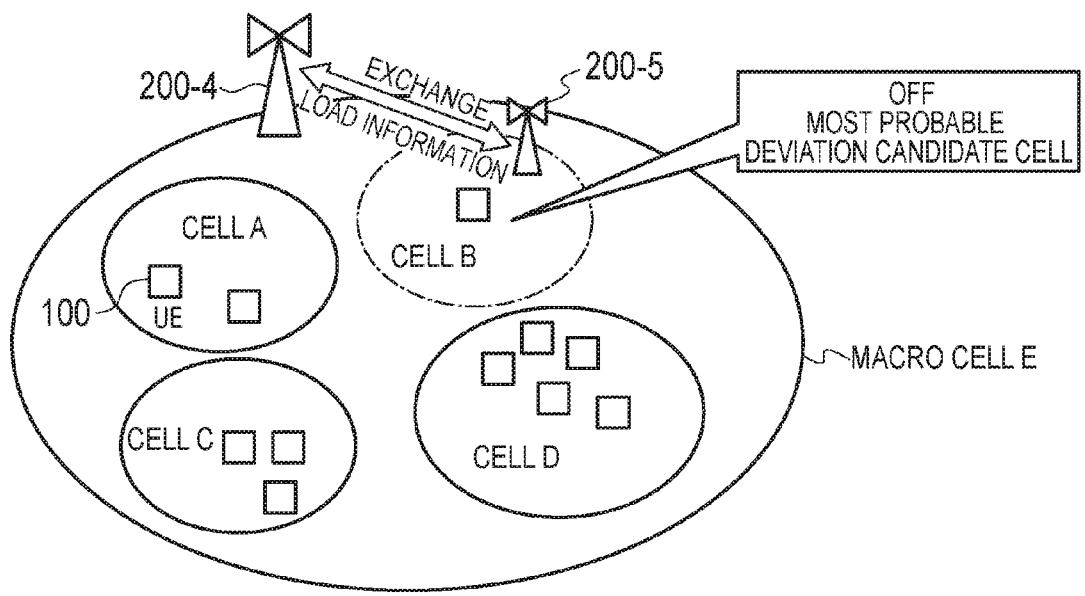
FIG. 3 is a diagram illustrating an operation when a deactivation target cell is powered on according to the first and second embodiments.

FIG. 3 is a diagram for describing the advanced ES technique.

A coverage area is formed by a macro cell E, a deactivation target cell B, and cells A, C, and D that are neighboring cells of the deactivation target cell B.

eNBs 200-4 and eNB 200-5 are illustrated as an eNB that manages the macro cell E and an eNB that manages the cell B, but the same eNB may manage the macro cell E and the cell B.

The eNB 200-5 that manages the deactivation target cell B notifies the eNB 200-4 of information related to a load of the deactivation target cell B. The macro cell E notifies the deactivation target cell B of information related to a load thereof (Exchange Load Information).

When the deactivation target cell B is powered off, the mobile station (UE) 100 that is performing communication under control of the deactivation target cell B is handed over to the macro cell E. When the load of the deactivation target cell B is relatively high, for example, when a plurality of UEs 100 are performing communication under control of the deactivation target cell B, the load on the macro cell E is likely to be excessively increased.

A given number of UEs 100 enter the deactivation target cell B through the handover from the neighboring cells (the cell A, the cell C, and the cell D) to the deactivation target cell B. On the other hand, a given number of the UE 100 leave the deactivation target cell B through the handover from the deactivation target cell B to the neighboring cells (the cell A, the cell C, and the cell D).

When the deactivation target cell B is powered off, the eNB 200-4 has to perform processes related to "the handover to the deactivation target cell B" and "the handover from the deactivation target cell B" additionally.

For this reason, it is necessary to decide whether or not the deactivation target cell B is powered off in view of the load of the deactivation target cell B, the number of handovers to the deactivation target cell B, and the number of handovers from the deactivation target cell B.

Figure 4:
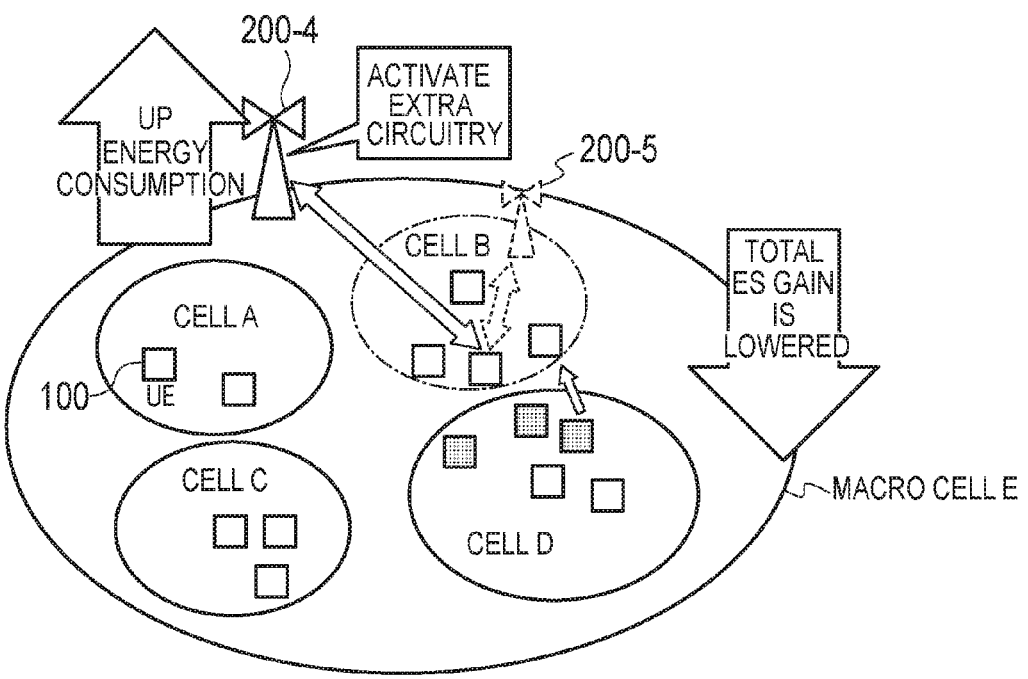
FIG. 4 is a diagram illustrating an operation when a deactivation target cell is powered off according to the first and second embodiments.

When the deactivation target cell is powered off with no consideration of the load of the deactivation target cell, the number of handovers to the deactivation target cell B, and the number of handovers from the deactivation target cell B, a situation in which the macro cell E and the neighboring cells have to increase the transmission power or the processing load in order to secure the communication capacity occurs. As a result, as illustrated in FIG. 4, electric power higher than electric energy that can be saved by powering off the deactivation target cell is likely to be necessary.

Due to the power-off of the deactivation target cell B, the macro cell E and the neighboring cells (the cell A, the cell C, and the cell D) are unlikely to secure sufficient communication capacity because of the UE 100 that is performing communication. In this case, there is a possibility that a communication quality (Quality of Service (QoS) provided to the UE 100 will deteriorate.

When the deactivation target cell B is powered on again due to the deterioration of the communication quality, it is necessary to hand the UE 100 that is performing communication over to the deactivation target cell B, and thus a handover processing load of the UE 100 is likely to increase.

(Operation of eNB that Manage Deactivation Target Cell)

In a power-off method according to the present embodiment, an apparatus that decides the power-off appropriately detects a power-off effect and performs the power-off.

Specifically, the eNB 200-5 counts a first handover number that is the number of handovers to the cell B in a predetermined period of time and a second handover number that is the number of handovers from the cell B in the predetermined period of time.

For example, the eNB 200-5 counts the number of handover requests received from the handover source eNB within a predetermined period of time and use the counted number as the first handover number.

The eNB 200-5 may count the number of handover requests transmitted from the eNB 200-5 to another eNB within a predetermined period of time and use the counted number as the second handover number.

A message that is a count target counted as the first handover number and the second handover number may be a handover request acknowledgement, a handover preparation failure, a UE context release, or a handover cancel. The eNB 200-5 may record a period of time in which each message of a count target is received or transmitted.

Figure 5:
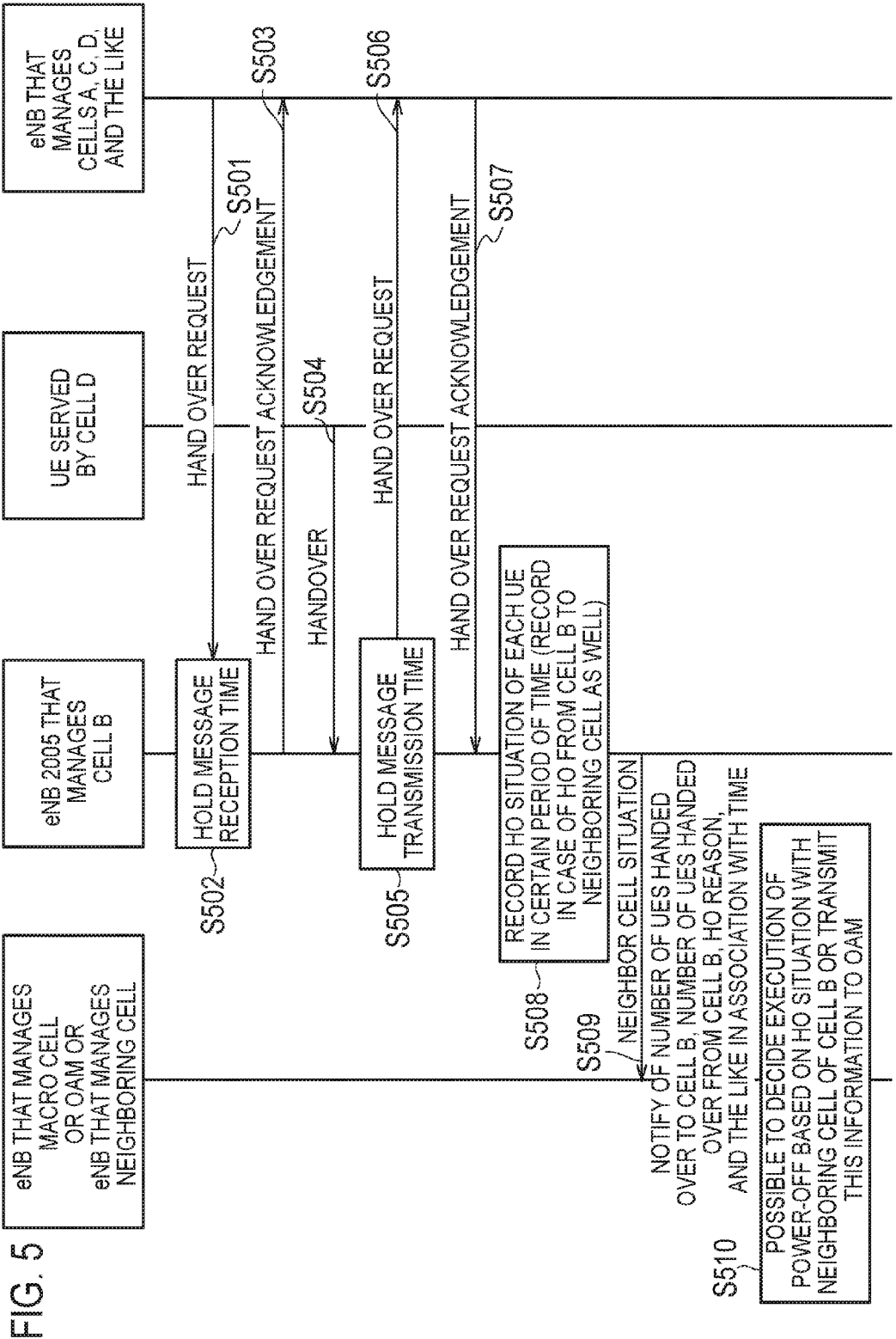
FIG. 5 is a sequence diagram according to the first embodiment.

A sequence of powering off the deactivation target cell B will be described with reference to FIG. 5.

The eNB 200-5 that manages the cell B receives the handover request that is the message indicating a desire of handover to the cell B from the eNBs that manage the cells A, C, and D (S501). The UE history information may be included in this message.

The eNB 200-5 counts the number of messages received in S501 and records a reception time (S502). At this time, the eNB 200-5 may record cell information of the handover source in association with the message.

The eNB 200-5 transmits a handover request acknowledgement to the eNB that has transmitted the handover request (S503).

The UE 100 that is a handover processing target is handed over to the cell B (S504).

The eNB 200-5 that manages the cell B transmits the handover request that is the message indicating a desire of handover from the cell B to the eNBs that manage the cells A, C, and D (S506). The UE history information may be included in this message.

The eNB 200-5 counts the number of messages transmitted in S506 and records a transmission time (S505). At this time, the eNB 200-5 record cell information of the handover destination together.

The eNB 200-5 receives the handover request acknowledgement from the eNB that has received the handover request (S507).

The UE 100 that is the handover processing target is handed over to the neighboring cell (not illustrated).

The eNB 200-5 transmits a neighbor cell situation to the eNB 200-4, an operation, administration, and maintenance (OAM) apparatus, or the eNB that manages the neighboring cell (S509).

The neighbor cell situation includes the number of messages counted in a predetermined period of time, that is, the number of handovers to the cell B (the first handover number) in a predetermined period of time and the number of handovers from the cell B (the second handover number) in the predetermined period of time. The neighbor cell situation may include information of a handover source cell, information of a handover destination cell, a handover reason, a counted period of time, times at which each message is transmitted and received.

The eNB 200-5 transmits a load situation of the cell B to the eNB 200-4, the OAM, or the eNB that manages the neighboring cell. The load situation may be included in the neighbor cell situation or may be included in another message.

The information may be notified through a message other than the neighbor cell situation (S510).

The eNB 200-4, the OAM, or the eNB that manages the neighboring cell decides whether or not the deactivation target cell B is powered off based on the first handover number, the second handover number, and the load situation of the cell.

The eNB 200-4 or the eNB that manages the neighboring cell may transmit information such as the first handover number and the second handover number to the OAM, and the OAM may decide whether or not the deactivation target cell B is powered off.

The eNB 200-4 and the OAM may acquire a neighbor cell relation table (NRT) from the eNB 200-5 or any other eNB and specify a neighboring cell of the deactivation target cell B.

An exemplary message format of the neighbor cell situation will be described with reference to FIG. 6.

HO History is an information element indicating information related to handover history. Incoming HO is an information element indicating the first handover number, and Cell ID is an information element indicating the handover source cell. Outgoing HO is an information element indicating the second handover number. Time Period is an information element indicating a period of time in which the number of handovers is counted.

A method of counting the number of handovers in the eNB 200-5 (the deactivation target cell B) will be described with reference to FIG. 7.

Upon receiving the handover request from the neighboring cell (HO request in S702), the eNB 200-5 (the deactivation target cell B) checks an identifier of the transmission source cell of the handover request and a reception time (S704). Then, the eNB 200-5 (the deactivation target cell B) counts the number of messages of the handover request for each transmission source cell, records a reception time, and generates a database related to the HO request, that is, a database related to the first handover number (S706).

Further, when the handover to the neighboring cell is executed (HO execution in S702), the eNB 200-5 (the deactivation target cell B) checks a handover execution time (S703) and generates a database related to the number of handover executions and the execution time, that is, a database related to the second handover number (S705). The number of handover executions may be the number of handover requests transmitted by the eNB 200-5 or may be the number of other messages.

The eNB 200-5 (the deactivation target cell B) gives a notification of information included in a constructed database to the apparatus that decides the power-off such as the OAM, the eNB 200-4 (the macro cell E), or the eNB 200-5 that manages the neighboring cell at a predetermined notification time (S707 and S708). The notification of the information is performed using the neighbor cell situation message.

The notification time may be designated by the eNB 200-4 or the OAM. The notification time may be set so that the notification is automatically given at regular time intervals or may be set so that the notification is given each time the database is updated.

As the notification of the information included in the database is given to the eNB that manages the neighboring cell, the neighboring cell can appropriately supplement the area when the deactivation target cell is powered off.

Further, as the notification of the information included in the database is given to the eNB 200-4, the eNB 200-4 can compare a reduced amount of electric power by the power-off of the deactivation target cell with an increase prediction of the macro cell.

The eNB 200-5 counts not only the number of handovers to the deactivation target cell (the first handover number) but also the number of handovers from the deactivation target cell (the second handover number), and thus the apparatus that decides the power-off can power off the deactivation target cell in view of the number of UEs 100 that stay in the deactivation target cell in a short period of time as well.

(Operation of Apparatus that Decides Power-Off)

An operation of deciding the power-off of the deactivation target cell B through the apparatus that decides the power-off (the OAM, the eNB 200-4, or the like) will be described with reference to FIG. 8.

In a predetermined time zone, the apparatus that decides the power-off such as the OAM or the eNB 200-4 is set to check whether or not the deactivation target cell is powered off (S802). For example, information for checking whether or not the deactivation target cell can be powered off from 21:00 to 24:00 is set in the apparatus that decides the power-off.

When the load situation of the neighboring cell (the load situation) of the deactivation target cell is a predetermined threshold value or less before a predetermined time zone, the apparatus that decides the power-off decides to power off the deactivation target cell, that is, decides to perform the ES, and instructs the deactivation target cell to perform the power-off (Yes in S803 and S810).

The apparatus that decides the power-off may perform S802, S803, and the like in view of the load of the deactivation target cell and the load of the cell that supplements the coverage of the deactivation target cell.

On the other hand, when the load situation of the neighboring cell (the load situation) exceeds the threshold value, and the database related to the deactivation target cell B is held, a handover request state in a predetermined time zone in the past, that is, the first handover number and the second handover number are checked (No in S803, Yes in S804, and S805). Then, when an average value of the first handover number and the second handover number in a predetermined period of time is a threshold value or less, the apparatus that decides the power-off decides to power off the deactivation target cell, that is, decides to perform the ES, and instructs the deactivation target cell to perform the power off (Yes in S808 and S810).

On the other hand, when the average value exceeds the threshold value, the apparatus decides to maintain the power-on state and does not give the power-off instruction (the ES instruction) (No in S808 and S809).

Further, when the apparatus that decides the power-off does not hold the database of the deactivation target cell B, the apparatus may acquire the database from the eNB 200-5 that manages the deactivation target cell B and decide whether or not the power-off is performed based on the acquired database (No in S804, S806, Yes in S807, S805, S808, S809, and S810).

When the eNB 200-5 that manages the deactivation target cell B does not hold the database, the apparatus decides to power off the deactivation target cell, that is, decides to perform the ES, and instructs the deactivation target cell to perform the power-off (No in S807 and S810).

An operation of deciding the power-off of the deactivation target cell B through the eNB 200-5 will be described with reference to FIG. 9.

When the load situation of the neighboring cell is a threshold value or less, the eNB 200-5 powers off the deactivation target cell (performs the ES) (Yes in S903 and S907). In this step, the eNB 200-5 may decide the power-off in view of the load situation of the deactivation target cell in addition to the load situation of the neighboring cell. For example, a threshold value may be set to the load situation of the deactivation target cell, and a similar process may be performed.

When the load situation of the neighboring cell exceeds the threshold value, and a database related to a handover is held, the eNB 200-5 checks a past HO request record in a predetermined time zone (an ES execution target period of time) in which the power-off is under review, that is, the first handover number and the second handover number (Yes in S904 and S905).

When the handover request record in a predetermined time zone in the past is less than a threshold value, the eNB 200-5 powers off the deactivation target cell (performs the ES) (No in S906 and S907).

When the handover request record in the predetermined time zone in the past is the threshold value or more, the eNB 200-5 transmits an inquiry indicating whether or not the power-off (the ES execution) of the deactivation target cell may be performed to the eNB 200-4 (Yes in S906 and S908). The inquiry may include the HO record, that is, the first handover number and the second handover number in a predetermined period of time, information related to a period of time in which the number of handovers is counted, and the load of the deactivation target cell.

The eNB 200-4 may give a notification indicating that the deactivation target cell is decided to be powered off to the eNB 200-5 instead of the inquiry. This notification may include the first handover number and the second handover number in a predetermined period of time, information related to a period of time in which the number of handovers is counted, and the load of the deactivation target cell.

The inquiry and the decision notification may be given using a cell deactivation message.

The eNB 200-4 that has received the cell deactivation message transmits a cell deactivation response or a cell deactivation failure to the eNB 200-5 as a response message. The cell deactivation response is a message for permitting the power-off and includes information specifying a cell that is a power-off target. The cell deactivation failure is a message for giving a notification indicating that the power-off is not permitted and includes information indicating a non-permission reason.

FIG. 10 illustrates an exemplary format of the cell deactivation message.

The cell deactivation message includes Cell ID that is a cell ID of the deactivation target cell, Cell Resource Situation indicating the load situation of the deactivation target cell, Number of Incoming HO indicating a total number of handover requests from the neighboring cell to the deactivation target cell in a predetermined time zone in the past (the first handover number), Number of Outgoing HO indicating a total number of handovers from the deactivation target cell to the neighboring cell in a predetermined time zone in the past (the number of handover executions and the second handover number), and Time Period indicating a predetermined time zone in which the first handover number and the second handover number are counted.

FIG. 11 illustrates an exemplary format of the cell deactivation response.

The cell deactivation response includes Deactivated Cell List indicating information specifying a group of cells to be powered off.

FIG. 12 illustrates an exemplary format of the cell deactivation failure.

Cause indicating that the power-off is not permitted is set in the cell deactivation failure.

Second Embodiment

A second embodiment will be described. A description of parts that are the same as in the first embodiment will be omitted, and a description will proceed focusing on different parts.

(Example in which eNB Including Deactivation Target Cell Includes Plurality of Cells)

Figure 13:
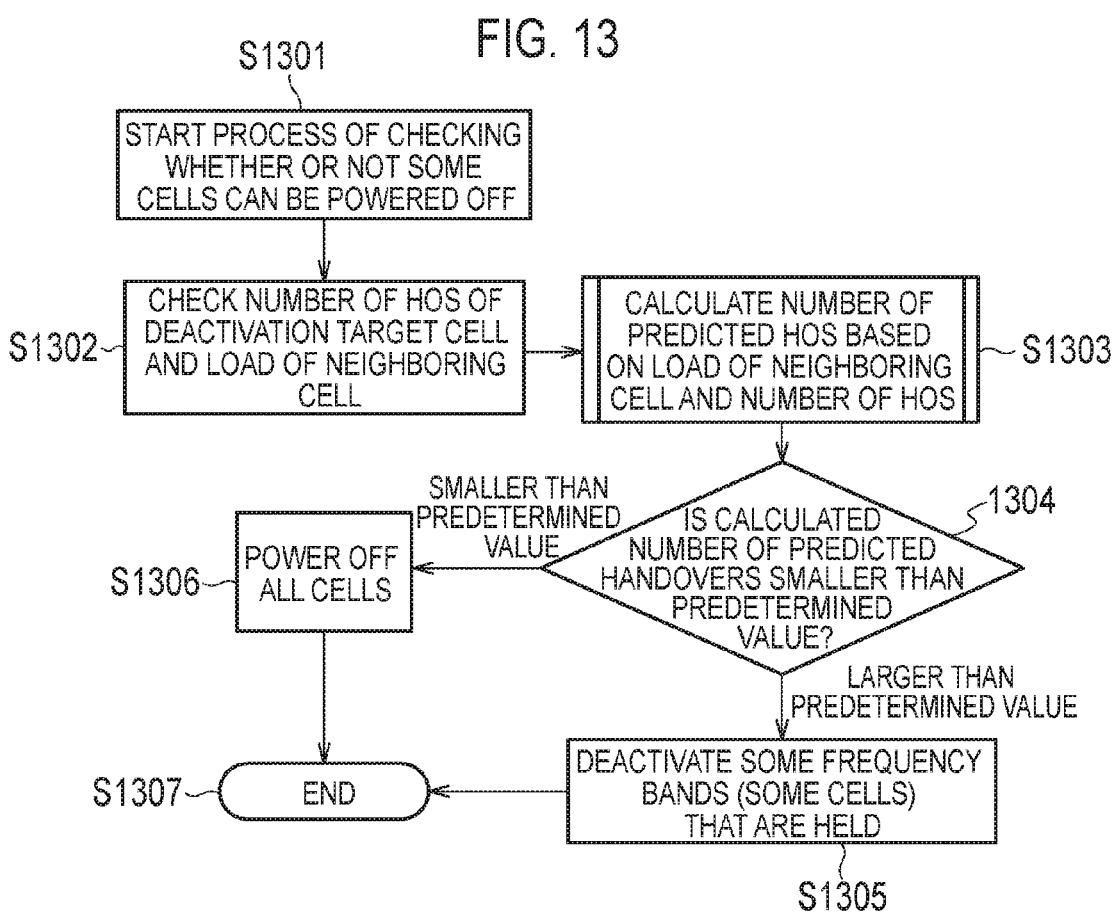
FIG. 13 is a flowchart according to the second embodiment.

An operation when the eNB 200-5 manages a plurality of cells whose coverages overlap at least partially will be described with reference to FIG. 13.

A method of counting the first handover number and the second handover number, a method of giving a notification to the eNB 200-4, the OAM, or the like, information to be included at the time of notification, and the like are the same as in the first embodiment.

A plurality of cells that overlap operate at different frequency bands. A plurality of cells that overlap may overlap the macro cell E in some areas. In this case, a predetermined communication area is formed by a plurality of cells managed by the eNB 200-5 and the macro cell managed by the eNB 200-4, and a communication capacity in the predetermined communication area is secured by the cells that overlap.

The eNB 200-5 starts a process of checking if some of a plurality of cells that overlap can be powered off (S1301).

The eNB 200-5 checks the number of handovers of the cell managed thereby (S1302). More specifically, the eNB 200-5 checks the number of handovers to the cell managed thereby (the first handover number) and the number of handovers the cell managed thereby (the second handover number) in a predetermined time zone for each cell. The eNB 200-5 checks the load of the neighboring cell (S1302).

The eNB 200-5 calculates the number of predicted handovers based on the load of the neighboring cell, the first handover number, and the second handover number (S1303).

When the calculated number of predicted handovers is smaller than a predetermined value, the eNB 200-5 powers off all the cells managed by the eNB 200-5 (S1304 and S1306).

When the calculated number of predicted handovers is larger than the predetermined value, the eNB 200-5 powers off some cells managed by the eNB 200-5, that is, stops using some frequency bands in the eNB 200-5 (S1304, S1305). Here, some cells are cells whose coverage can be supplemented by another overlapping cell managed by the eNB 200-5.

The eNB 200-5 may decide to power off some or all of the cells managed thereby based on the first handover number, the second handover number, the load of the deactivation target cell, and the load of the neighboring cell.

The eNB 200-5 gives a notification indicating the power-off decision to the eNB 200-4 or the OAM. This notification includes information of the cell and information related to a period of time in which the first handover number, the second handover number, and the number of handovers are counted.

Particularly, when some areas of the deactivation target cell overlap the macro cell E, the deactivation target cell is powered off, and thus the load on the eNB 200-4 is likely to increase. For this reason, the eNB 200-5 has to give a notification indicating that the deactivation target cell is powered off to the eNB 200-4 in advance.

The eNB 200-4 or the OAM that has received the notification transmits a response message indicating that the power-off is permitted, a message indicating that the power-off is not permitted, or a response message indicating that some cells are permitted to be powered off.

The messages described in the first embodiment may be used for the notification and the response.

The eNB 200-4, the OAM, or the like may acquires the first handover number, the second handover number, and the load of the neighboring cell, calculate the number of predicted handovers, and make the power-off decision based on the number of predicted handovers and the load situations of a plurality of cells.

Further, when the eNB 200-5 manages the deactivation target cell and a plurality of cells that overlap, the eNB 200-4 or the OAM may acquire loads of a plurality of cells of the cells managed by the eNB 200-5 and information related to a period of time in which the first handover number, the second handover number, and the number of handovers of a plurality of cells are counted and decide to power off some or all of the cells.

Effects

Effects obtained by applying the first and second embodiments will be described.

If the communication control methods described in the first and second embodiments are applied, when the deactivation target cell is powered off, the apparatus that decides the power-off decides whether or not the deactivation target cell is powered off in view of the load of the deactivation target cell, the load of the neighboring cell, the number of handovers to the deactivation target cell, the number of handovers from the deactivation target cell, and the number of predicted handovers. Thus, it is possible to check the power saving effect by the power-off in the entire area, for example, the entire area of the macro cell E and perform the power-off.

For example, the apparatus that decides the power-off can power off the deactivation target cell, compares an increased amount of predicted power required for the macro cell E with power consumption that can be reduced by the power-off of the deactivation target cell, and make the power-off decision.

Further, the apparatus that decides the power-off can decide whether or not the power-off is performed in view of influence on the communication quality (QoS) of the UE 100.

Further, since the situations of the deactivation target cell and the neighboring cell are detected together with the handover, it is possible to prevent the eNB 200-5 from frequently repeating the power-on and the power-off of the deactivation target cell due to a sudden change in the load situation and increasing the handover load of the UE 100 more than necessary.

For a period of time in which the deactivation target cell is powered off, the apparatus that may decide the power-off designates a power-off time, or a period of time in which the deactivation target cell is powered off may be decided based on the load situation of the neighboring cell.

Figure 14:
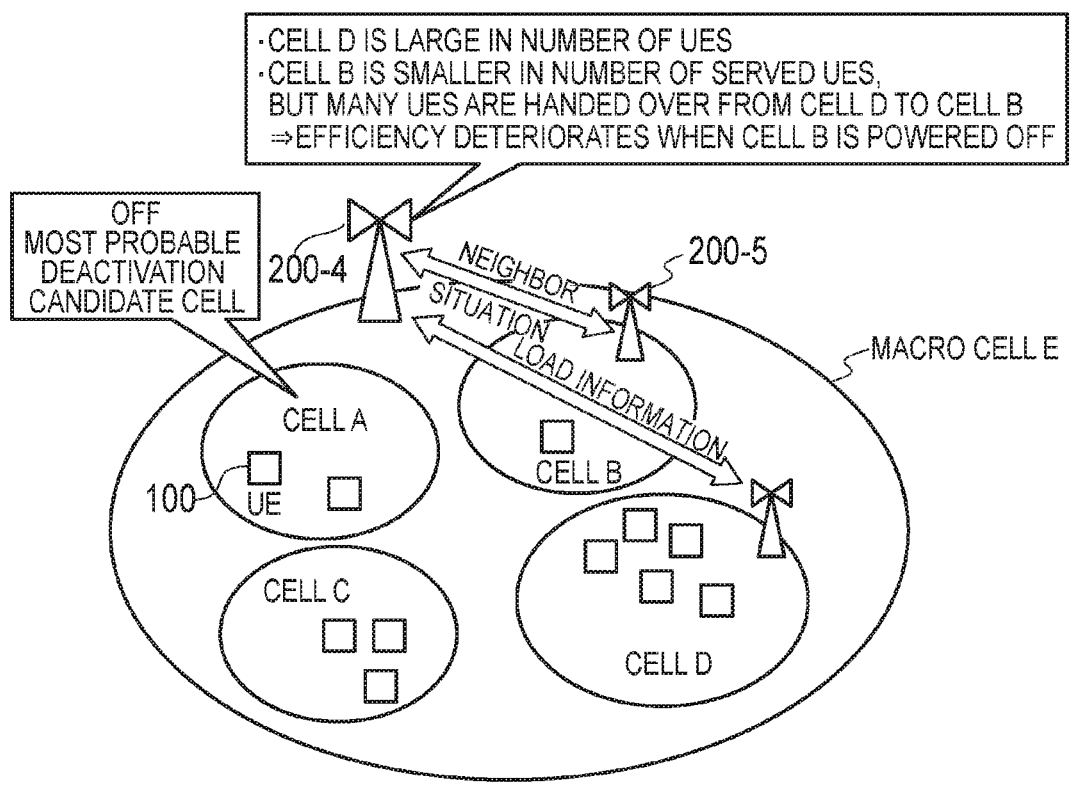
FIG. 14 is a diagram illustrating an operation according to the first and second embodiments.

The apparatus that decides the power-off can decide the deactivation target cell based on the situation of each cell. For example, as illustrated in FIG. 14, the eNB 200-4 decides the cell to be powered off based on the load situations of the cells A, B, C, and D of the power-off target candidate, the first handover number, or the second handover number.

The cell D is large in the number of UEs 100, and the cell B is large in the number of handovers from the cell D. In this case, the cell B that is smallest in the number of UEs 100 is excluded from the deactivation target candidate. Of the cell A and the cell C, the cell A that is smaller in the number of UEs 100 is selected as the deactivation target cell.

Other Embodiments

Through the function distribution of the eNB 200-4, the eNB 200-5, the OAM, and the like, even in other distributions than the above-described one, it is possible to decide whether or not the deactivation target cell is powered off in view of the situations such as the load of the deactivation target cell, the load of the neighboring cell, the first handover number, and the second handover number.

It will be appreciated that one other than one described in the above embodiments can be applied as the timing or the message for notifying of information necessary for deciding whether or not the deactivation target cell is powered off.

Instead of the first handover number and the second handover number, information indicating a degree of the number of handovers such as High/Mid/Low or High/Low may be used.

The eNB 200-5 may count the first handover number and the second handover number in a designated period of time or may count the number of handovers per unit time.

The eNB 200-5 may acquire the threshold value of the load situation and the threshold values of the first handover number and the second handover number from another radio base station or the OAM.

In the above embodiments, the LTE system has been described as an example of the mobile communication system, but the present invention is not limited to the LTE system and may be applied to any other system than the LTE system.

The entire contents of Japanese Patent Application No. 2014-059274 are incorporated herein by reference.

INDUSTRIAL APPLICABILITY

The present invention is useful in a radio communication field such as mobile communication.

The invention claimed is:

1. A communication control method, comprising the steps of:
    counting, by a first radio base station, a first handover number that is the number of handovers to a cell managed by the first radio base station and a second handover number that is the number of handovers from the cell in a predetermined period of time;
    notifying, by the first radio base station, a second radio base station or an operation, administration and maintenance (OAM) apparatus of the first handover number, the second handover number and a load situation of the cell; and
    deciding, by the second radio base station or the OAM apparatus, whether or not the cell is to be powered off based on the first handover number, the second handover number and the load situation of the cell.

2. The communication control method according to claim 1,
    wherein the first radio base station manages a plurality of cells whose coverages overlap at least partially,
    the first radio base station counts the first handover number of each of the plurality of cells and the second handover number of each of the plurality of cells,
    the first radio base station notifies the second radio base station or the OAM apparatus of the first handover number of each of the plurality of cells and the second handover number of each of the plurality of cells, and
    the second radio base station or the OAM apparatus decides a cell to be powered off among the plurality of cells based on the first handover number, the second handover number, and load situations of the plurality of cells.

3. The communication control method according to claim 1,
    wherein the first radio base station notifies the second radio base station or the OAM apparatus of information indicating the predetermined period of time together with the first handover number and the second handover number.

4. The communication control method according to claim 3,
    wherein the second radio base station or the OAM apparatus decides a cell to be powered off among the plurality of cells based on a number of predicted handovers to the plurality of cells and load situations of the plurality of cells, and the number of predicted handovers is estimated based on the first handover number, the second handover number, and load situation of neighboring cells of the plurality of cells.

5. The communication control method according to claim 1,
    wherein the first handover number is counted for each handover source cell, and
    the second handover number is counted for each handover destination cell.

6. A communication control method, comprising the steps of:
    counting, by a first radio base station, a first handover number that is the number of handovers to a cell managed by the first radio base station and a second handover number that is the number of handovers from the cell in a predetermined period of time;
    deciding, by the first radio base station, whether or not the cell is to be powered off based on the first handover number, the second handover number, a load situation of the cell and a load situation of a neighboring cell; and
    giving, by the first radio base station, a notification indicating that the cell is to be powered off to a second radio base station or an operation, administration and maintenance (OAM) apparatus when the cell is powered off.

7. The communication control method according to claim 6,
    wherein the first radio base station further gives a notification of the first handover number, the second handover number, and the load situation of the cell to the second radio base station or the OAM apparatus in addition to the notification indicating that the cell is to be powered off when the cell is powered off.

8. The communication control method according to claim 7,
    wherein the first radio base station further notifies the second radio base station or the OAM apparatus of information indicating the predetermined period of time in addition to the first handover number and the second handover number.

9. The communication control method according to claim 6,
    wherein the first radio base station manages a plurality of cells whose coverages overlap at least partially,
    the first radio base station counts the first handover number of each of the plurality of cells and the second handover number of each of the plurality of cells,
    the first radio base station decides at least one cell to be powered off among the plurality of cells based on the first handover number of each of the plurality of cells, the second handover number of each of the plurality of cells, load situations of the plurality of cells, and load situations of neighboring cells of the plurality of cells, and
    the first radio base station notifies the second radio base station or the OAM apparatus of information indicating the decided cell.

10. The communication control method according to claim 9,
    wherein the first radio base station further notifies the second radio base station or the OAM apparatus of the first handover number and the second handover number in addition to the information indicating the decided cell.

11. The communication control method according to claim 9,
wherein the first radio base station decides a cell to be powered off among the plurality of cells based on a number of predicted handovers in the predetermined period of time and load situations of the plurality of cells, and
the number of predicted handovers is estimated based on the first handover number, the second handover number, and load situation of neighboring cells of the plurality of cells.

12. The communication control method according to claim 6,
wherein the second radio base station or the OAM apparatus transmits a message indicating that the cell is permitted to be powered off or a message indicating that the cell is not permitted to be powered off.

13. A radio base station, comprising:
a controller configured to count a first handover number that is the number of handovers to a cell managed by the radio base station and a second handover number that is the number of handovers from the cell in a predetermined period of time,
wherein the controller is further configured to notify a second radio base station or an operation, administration and maintenance (OAM) apparatus of the first handover number and the second handover number, and a load situation of the cell, and
the first handover number, the second handover number and the load situation of the cell provide bases for deciding whether or not the cell is to be powered off.

14. A radio base station, comprising:
a controller configured to count a first handover number that is the number of handovers to a cell managed by the radio base station and a second handover number that is the number of handovers from the cell in a predetermined period of time,
wherein the controller is further configured to decide whether or not the cell is to be powered off based on the first handover number, the second handover number, a load situation of the cell and a load situation of a neighboring cell, and
the controller is further configured to notify a second radio base station or an operation, administration and maintenance (OAM) apparatus of the first handover number, the second handover number and the load situation of the cell when the cell is powered off.

* * * * *